Nov. 17, 1970 J. P. JARVIS 3,541,260

AUDIO MIXING SYSTEM

Filed March 20, 1968 5 Sheets-Sheet 1

INVENTOR
John P. Jarvis
by McDougall, Hersh, Scott and Ladd Att'ys

United States Patent Office 3,541,260
Patented Nov. 17, 1970

3,541,260
AUDIO MIXING SYSTEM
John P. Jarvis, Northridge, Calif., assignor to Scientific Industries, Inc., Santa Ana, Calif., a corporation of California
Filed Mar. 20, 1968, Ser. No. 714,592
Int. Cl. H04r 1/20
U.S. Cl. 179—1 6 Claims

ABSTRACT OF THE DISCLOSURE

An audio mixing system, comprising a plurality of input modules, a plurality of program buses connected to said input modules, a plurality of reverberation buses connected to said input modules, a plurality of output modules, means connecting each output module to one of said program buses and the corresponding reverberation bus, a plurality of reverberation generators connected to the respective output modules, each output module including a program amplifier for amplifying the audio signals from the corresponding program bus, a reverberation amplifier connected between the corresponding reverberation bus and the input to the corresponding reverberation generator, a monitor output connected to the output of said program amplifier, and control means for selectively switching the output of said reverberation generator between the input of said program amplifier and said monitor output. Each input module preferably comprises an amplifier, a negative feedback path between the output and the input of said amplifier, a low frequency equalization network connected into said negative feedback path, and a high frequency equalization network connected into said path in cascade with said low frequency equalization network, each network comprising a pair of series connected capacitors, a first resistor connected between the junction of said capacitors and the common terminal of the amplifier, and a second resistor connected in parallel with said series connected capacitors. A switching system or the like is preferably provided to change the values of said capacitors so as to change the boost frequency range. Means are preferably provided for changing the value of the first resistor while inversely changing the value of the second resistor for changing the extent of the boost.

This invention relates to an audio mixing system, which will find many applications, but is particularly applicable to recording studios and sound reinforcing systems for theaters, meeting rooms, or the like.

The art of audio mixing systems is well developed, but it has been the prevailing practice in the past to design and construct audio mixing systems on the basis of the link chain approach, in which each separate function is associated with a discrete piece of equipment, such as an amplifier, an attenuator, a switching device, or the like. This approach results in extremely elaborate and costly mixing systems which utilize thousands of feet of shielded cable to connect the various components.

In contrast, the present invention provides a modular mixing system which is capable of meeting the needs of most recording studios and sound reinforcing systems, yet is a great improvement from the standpoints of compactness and economy.

Thus, the audio mixing system of the present invention preferably comprises a plurality of input modules for receiving the inputs from various microphones or the like. Each input module is connected to a plurality of program buses and a plurality of reverberation buses. Each input module is preferably arranged so that its output may be supplied to any of said buses. The system also comprises a plurality of output modules. Each output module is connected to one of the program buses, and the corresponding reverberation bus. Reverberation generators are connected to the respective output modules. Each output module comprises a program amplifier for amplifying the audio signals from the corresponding program bus. Each output module also comprises a reverberation amplifier connected between the corresponding reverberation bus and the input to the corresponding reverberation generator. Each output module also preferably comprises a monitor output, connected to the output of the program amplifier, and control means for selectively switching the output of the reverberation generator between the monitor output and the input to the program amplifier.

Each input module preferably comprises an amplifier, with low and high frequency equalization networks connected into the negative feedback path between the output and the input of the amplifier, for boosting selected low and high frequency ranges. The equalization networks avoid the use of inductors, while still achieving very favorable boost characteristics. The low and high frequency equalization networks are connected in cascade in the negative feedback path. Each network preferably comprises a pair of series connected capacitors in the feedback path, a first resistor connected between the junction of the capacitors and the common terminal of the amplifier, and a second resistor connected in parallel with the series connected capacitors. Means are preferably provided to change the values of the capacitors so as to change the boost frequency range. It is also preferred to provide means for changing the value of the first resistor, while inversely changing the value of the second resistor, so as to change the extent of the boost.

Various other objects, advantages and features of the present invention will appear from the following description, together with the accompanying drawings, in which.

Figure 1:
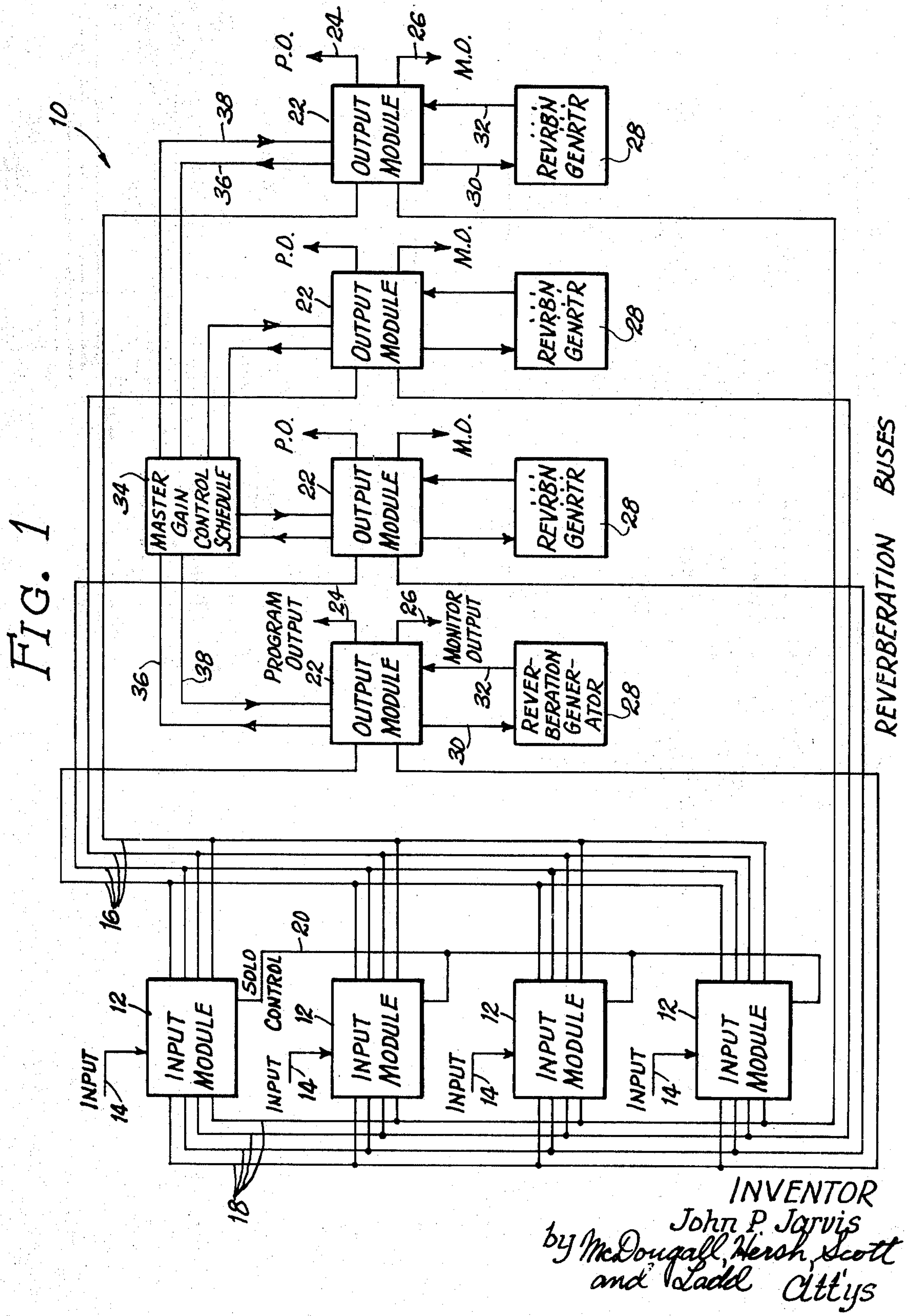
FIG. 1 is a block diagram illustrating an audio mixing system to be described as an illustrative embodiment of the present invention.

As just indicated, FIG. 1 illustrates an audio mixing system 10 comprising a plurality of input modules 12, each of which is provided with an input line or connection 14, for receiving input signals from a microphone, phonograph pickup, tape recorder, or the like. The number of input modules may be varied widely, to suit the needs of the system. Generally, one input module is provided for each microphone or other input device.

The input modules 12 have outputs connected to a plurality of program buses 16 and a plurality of reverberation buses 18. Four program buses 16 and four reverberation buses 18 are shown but the number of buses may be varied to suit the needs of the system.

A solo control line 20 is connected to each of the input modules 12. The line 20 is one component of a solo control system, whereby any selected input module may be operated alone by actuating a pushbutton switch or the like on such module, as will be described in greater detail presently. The operation of the solo switch on the selected input module causes the other modules to go dead, so that the signal handled by the selected module may be heard on a solo basis.

The audio mixing system 10 is also provided with a plurality of output modules 22, each of which is connected to one of the program buses 16, and the corresponding reverberation bus 18. Thus, the number of output modules preferably corresponds to the number of buses. Each output module has a program output line 24 and a monitor output line 26. The program output lines 24 may be connected to any desired equipment for utilizing the program output signals. Similarly, the monitor output lines 26 may be connected to any suitable monitoring equipment.

The illustrated system 10 comprises a plurality of reverberation generators 28 which are connected to the respective output modules 22. Preferably, each output module 22 is arranged so that the signal from the corresponding reverberation bus 18 is amplified and supplied over reverberation send line 30 to the associated reverberation generator 28. The output of the reverberation generator 28 is returned to the output module over a reverberation receive line 32. The arrangement of the output module 22 is such that the output of the reverberation generator 28 may be mixed with the program signal, or may be switched to the monitor output 26. In this way, the reverberation signal may be monitored before it is mixed with the program signal.

The mixing system 10 also preferably comprises a master gain control module 34, connected to all of the output modules 22, so that the gain of all of the modules may be varied simultaneously. It will be seen that signal lines 36 and 38 are connected between each output module 22 and the master gain module 34.

It will be understood that the input modules 12, the output modules 22, and the master gain control module 34 may be assembled in a single console or other housing. Normally, the reverberation generators 28 are more or less remote from the console. The modules 12, 22 and 34 are preferably of the plug in type, so as to be readily removable and replaceable.

Figure 2:
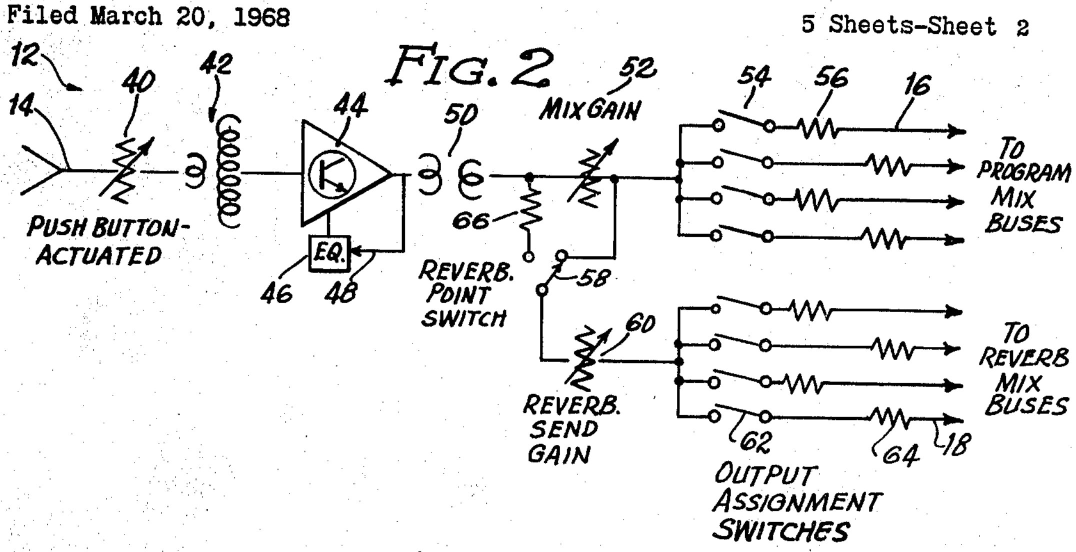
FIG. 2 is a block diagram of one of the input modules of the system.

FIG. 2 constitutes a block diagram of one of the input modules 12. As illustrated, a variable attenuator 40 is connected to the input line 14. The attenuator 40 may include pushbutton control switches, as will be described in detail presently. An input transformer 42 is provided between the attenuator 40 and the input of the transistorized amplifier 44.

An equalizer 46 is preferably provided for changing the frequency response of the amplifier 44. The equalizer 46 is preferably capable of boosting and cutting selected frequency ranges, at both high and low frequencies. In this case, the equalizer 46 is connected into the negative feedback path 48 of the amplifier 44.

As shown, an output transformer 50 is connected between the amplifier 44 and the mixer gain control 52, adapted to vary the level of the program output signals from the input module. Output switches 54 are preferably provided for selectively assigning the output of the module to any of the program buses 16. Thus, there are four of the output switches 54. Decoupling resistors 56 are preferably connected between the switches 54 and the program buses 16.

The output transformer 50 also provides output signals to the reverberation buses 18. A two position switch 58 is preferably provided so that the reverberation output may be derived either before or after the mixer gain control 52. It will be seen that a reverberation gain control 60 is connected between the switch 58 and a set of reverberation output switches 62, operable to assign the reverberation output to any of the reverberation buses 18. The level of the reverberation output may be changed by varying the gain control 60. Decoupling resistors 64 are connected between the switches 62 and the reverberation buses 16. Attenuating means 66 are preferably connected between the output transformer 50 and the selector switch 58, to attenuate the reverberation output when such output is being derived directly from the transformer.

Figure 3:
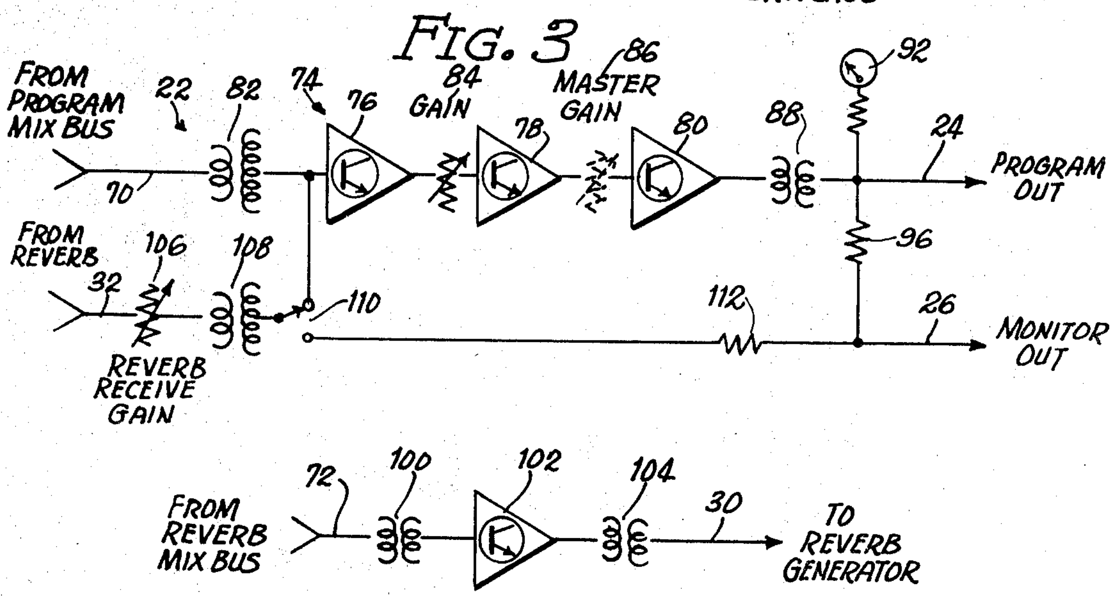
FIG. 3 is a block diagram of one of the output modules.

FIG. 3 constitutes a block diagram of one of the output modules 22. It will be seen that the output module 22 comprises a program input line 70 which is connected to one of the program buses 16. The output module 22 also has a reverberation input line 72 which is connected to the corresponding reverberation bus 18.

The illustrated program module 22 comprises a program amplifier 74, having a plurality of amplifier stages 76, 78 and 80. An input transformer 82 is preferably connected between the input line 70 and the first stage 76. In this case, a gain control 84 is connected between the first and second stages 76 and 78. Another gain control 86 is connected between the stages 78 and 80. The gain control 86 is preferably a component of the master gain control module 34.

It will be seen that the output transformer 88 is connected between the last amplifier stage 80 and the program output line 24. A V.U. meter 92 is preferably connected to the output line 24 to indicate the output level. The monitor output line 26 is also preferably connected to the output line 24, through decoupling means 96.

An input transformer 100 is connected between the reverberation input line 72 and the reverberation amplifier 102. The output of the amplifier 102 is connected through an output transformer 104 to the reverberation send line 30 which extends to the input of the reverberation generator 28.

The output line 32 from the reverberation generator 28 is connected through a reverberation receive gain control 106 to another input transformer 108. A control device, preferably in the form of a selector switch 110, is provided for switching the output of the transformer 108 between the input of the program amplifier 74 and the monitor output line 26. Attenuating means 112 are preferably provided between the selector switch 110 and the monitor output line 26.

Figure 5:
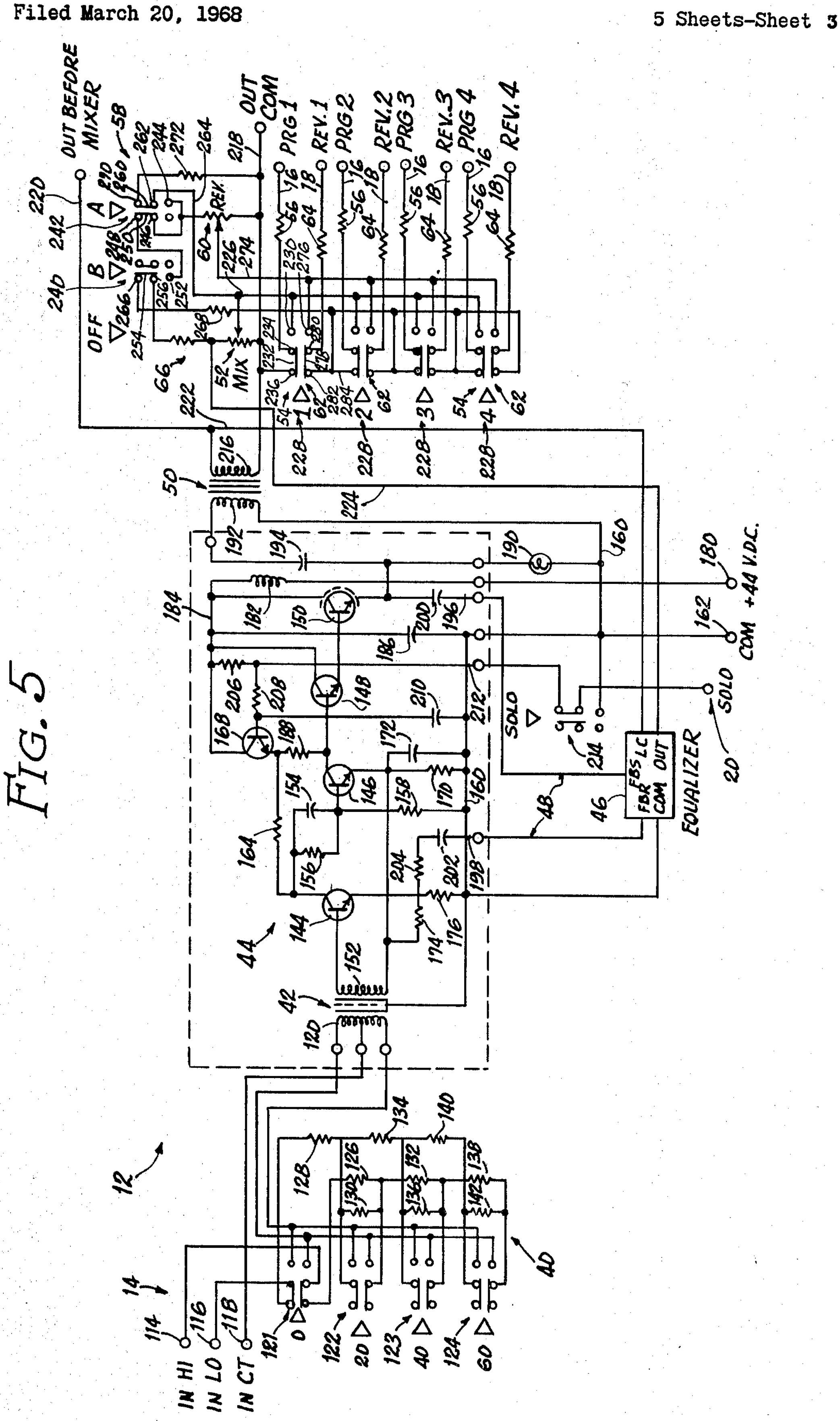
FIG. 5 is a schematic wiring diagram of one of the input modules.

Details of one of the input modules are shown in FIG. 5. The input line 14 and the input transformer 42 are arranged to accept either balanced or unbalanced inputs. Thus, the input line 14 has end terminals 114 and 116, as well as a center tap 118, which are connected to corresponding terminals of a primary winding 120 on the input transformer 42.

The illustrated attenuator 40 comprises a plurality of switches 121–124, preferably of the pushbutton type, operable to provide different degrees of attenuation. Thus, for example, the switches 121–124 may be arranged to attenuate the input signals by 0, 20, 40 and 60 db. When the switch 121 is operated, the input terminals 114–118 are connected directly to the primary winding 120. When the switch 122 is operated, attenuating resistors 126 and 128 are connected between the primary 120 and the input terminals 114 and 116. Another resistor 130 is bridged across the primary 120. The switches 121–124 are preferably interlocked mechanically so that only one switch can be operated at one time.

Operation of the third switch 123 cuts in another stage of attenuation, comprising series resistors 132 and 134, and a bridging resistor 136. Still another stage of attenuation is introduced into the input circuit by operating the switch 124. Such stage comprises series resistors 138 and 140 and a bridging resistor 142. It will be understood that the construction of the attenuator 40 may be varied considerably. The provision of the attenuator makes it possible to accept inputs at widely varying levels.

The amplifier 44 of the input module 10 comprises a plurality of stages utilizing a plurality of transistors 144, 146, 148 and 150. The input transformer 42 has a secondary winding 152, one side of which is connected to the base of the transistor 144. The output from the transistor 144 is derived from the collector, through a coupling capacitor 154, connected between the collector and the base of the next transistor 146. A high value biasing resistor 156 is connected across the capacitor 154, to bias the base of the transistor 146. The biasing arrangement also includes another high value resistor 158 connected between the base and a common or ground lead 160, which is connected to the negative power supply terminal 162. A high value load resistor 164 is connected between the collector of the first transistor 144 and a positive terminal 166. The positive voltage at the terminal 166 is subject to the control of the switching transistor 168 as will be described in detail presently.

As shown, the emitter of the second transistor 146 is connected to the common lead 160 through a biasing resistor 170, bridged by a by-pass capacitor 172. The emitter of the first transistor 144 is connected to the emitter of the second transistor by a resistor 174. Another resistor 176 is connected between the emitter of the first transistor 144 and the common lead 160. The resistors 174 and 176 apply a portion of the biasing voltage, developed across the resistor 170, to the emitter of the first transistor 144. The resistors 174 and 176 also function as input resistors in the negative feedback circuit, as well be described in greater detail presently.

The transistor 148 provides direct coupling between the transistors 146 and 150. Thus, the collector of the transistor 146 and connected directly to the base of the transistor 148. The emitter of the transistor 148 is connected directly to the base of the transistor 150. The positive supply voltage is applied directly to the collector of the transistor 148. Thus, the positive power supply terminal 180 is connected through a filtering inductor or coil 182 to a positive supply lead 184, to which the collector of the transistor 148 is directly connected. A by-pass capacitor 186 is connected between the supply lead 184 and the common lead 160.

A load resistor 188 is connected between the collector of the second transistor 146 and the supply terminal 166. Thus, the second transistor 146 is also subject to the switching action of the transistor 168, to be described in detail presently.

The fourth transistor 150 is operated as an emitter follower stage. Thus, the collector is connected directly to the positive supply lead 184. A load resistor, in the form of a lamp 190, is connected between the emitter and the common lead 160. The output transformer 50 has a primary winding 192, one side of which is coupled to the emitter through a coupling capacitor 194 of large value. The other side of the primary 192 is connected directly to the common lead 160.

The negative feedback circuit comprises a feedback send line 196 and a feedback receive line 198, both of which are included in the feedback path 48, previously mentioned. A coupling capacitor 200 is connected between the emitter of the transistor 150 and the feedback send line 196. The feedback send line 196 and the feedback receive line 198 are connected to the equalizer 46, as will be described in greater detail presently. It will be seen that a coupling capacitor 202 and a resistor 204 are connected in series between the feedback send line 198 and the emitter of the first transistor 144.

The switching transistor 168 is employed in the solo control circuit, whereby any of the input modules 10 may be selected for solo operation. It will be seen that the collector of the transistor 168 is connected to the positive supply lead 184, while the emitter is connected to the supply terminal 166. The transistor 168 is normally biased to a conductive state by connecting the positive supply lead 184 to the base of the transistor 168 through high value biasing resistors 206 and 208. A by-pass capacitor 210 is connected between the base and the common lead 160. A control lead 212 is connected to the junction between the resistors 206 and 208. The transistor 168 is adapted to be rendered nonconductive by connecting the control lead 212 to the common lead 160. Normally, the control lead 212 is connected to the solo line 20, previously mentioned, through a solo selector switch 214, which is preferably of the pushbutton type. When the solo switch 214 is operated, the solo line 20 is connected to the common lead 160 while the control lead 212 is disconnected from the solo line. Thus, the operation of the solo switch 214 of any particular input module 10 does not affect the operation of that particular module, but all of the other input modules are rendered inoperative, due to the grounding of the solo line, which causes the switching transistors 168 of the other modules to become nonconductive, so that the power is disconnected from the first two transistors 144 and 146 of the other modules. The output transformer 50, previously mentioned, has a secondary winding 216, having one side connected to the output common line 218, which is separate from the amplifier common lead 160. The other side of the secondary 216 is connected to an output line 220, which provides an output signal which is not affected by the mixer gain control 52, previously mentioned.

The equalizer 46 provides a low cut circuit, through which the program output signal is directed, as will be described in greater detail presently. The low cut circuit provides selective attenuation of the low audio frequencies. In view of the low cut circuit, the program output signals are directed along a low cut line 222 from the secondary winding 216 to the equalizer 46. After passing through the low cut circuit in the equalizer 46, the program signals are directed along an output line 224 to the mixer gain control 52, which is preferably in the form of a continuously variable potentiometer.

Thus, one side of the mixer gain control 52 is connected to the output line 224 while the other side is connected to the output common 218. The slider of the gain control 52 is connected to a line 226 which leads to the program output switches 54, previously mentioned. As shown, each program output switch 54 is combined with the corresponding reverberation output switch 62. The combined switches, to be designated 228, are preferably of the two-position pushbutton type, and are not interlocked, so that any or all of the output switches can be operated. Thus, the program output signals can be directed to one or more of the program buses 16.

When each program switch 54 is actuated, the line 226 is connected through a stationary contact 230, a movable contact 232, a stationary contact 234, and the decoupling resistor 56, previously mentioned, to the corresponding program bus 16. When the switch 54 is not actuated, the movable contactor 232 connects the stationary contact 234 to another stationary contact 236 which is connected to the output common 218.

The reverberation selector switch 58 is illustrated as comprising two pushbutton switches 240 and 242, which preferably are mechanically interlocked, so that only one of the switches can be operated at one time. The switch 58 also preferably has an off position, in which neither the switch 240 nor the switch 242 is actuated. Actuation of the switch 240 connects the reverberation gain control 60, previously mentioned, to the output line 224, before the mixer gain control 52. Actuation of the switch 242 connects the reverberation gain control 60 to the output line 226, after the mixer gain control.

The reverberation gain control 60 is preferably in the form of a potentiometer having one side connected to the output common 218. The other side is connected to the stationary contacts 244 and 246 of the switch 242. When the switch 242 is not actuated, the stationary contact 246 is connected to a stationary contact 248 by a movable contactor 250. It will be seen that the contact 248 is connected to a stationary contact 252 of the switch 240 When the switch 240 is actuated, the contact 252 is connected to the output line 224 by a movable contactor 254, a stationary contact 256, and the attenuating device 66, previously mentioned, which is preferably in the form of a resistor.

When the switch 242 is actuated, the reverberation gain control 60 is connected to the output line 226 through the stationary contact 244, a movable contactor 260, stationary contact 262, and a lead 264. When the switch 242 is actuated, the switch 240 is not actuated. The movable contactor 254 moves away from the contact 52 and into engagement with a fixed contact 226. A resistor 268 is connected between the fixed contact 266 and the output common 218. Thus, the resistor 268 is switched into the circuit instead of the reverberation gain control 216. Preferably, the resistor 268 is of the same value as the gain control 60. Thus, operation of the switch 240 does not materially affect the level of the program signal.

When the switch 242 is not actuated, the movable contactor 260 moves away from the contact 244 and into engagement with the contact 270. A resistor 272 is connected between the contact 270 and the output common 218. Thus, a resistor 272 is connected to the line 226 in place of the reverberation gain control 60. The resistor 272 is preferably of the same value as the gain control 60.

Figure 4:
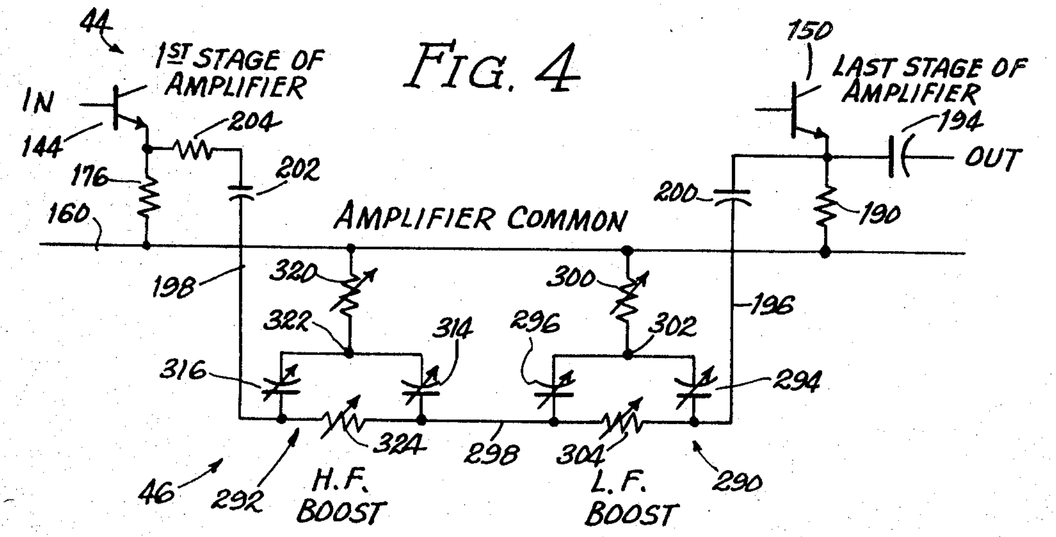
FIG. 4 is a simplified schematic diagram of the equalization system, as employed in each of the input modules.
Figure 6:
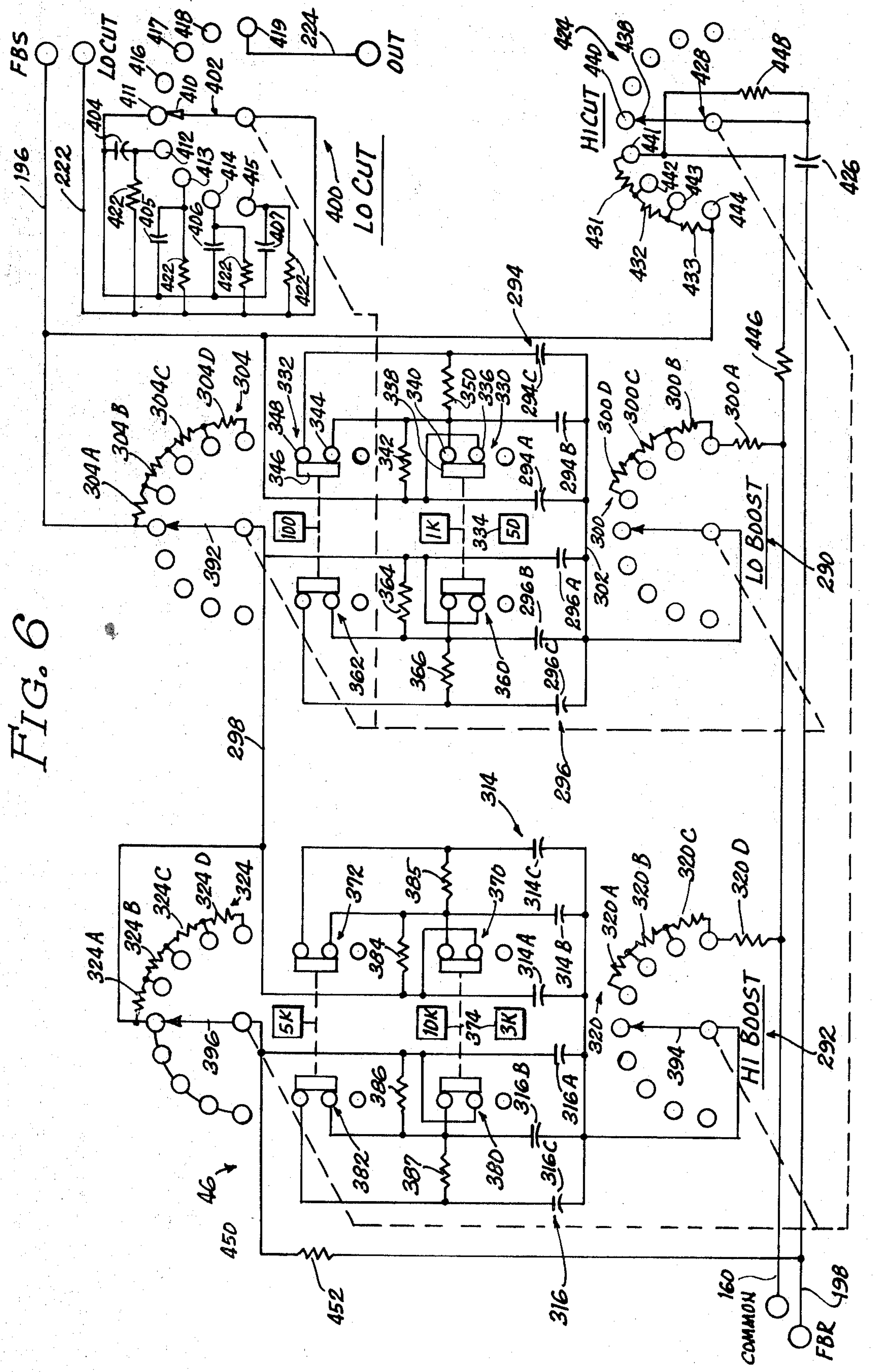
FIG. 6 is a schematic wiring diagram of the equalizer employed in connection with the input module.

The slider of the reverberation gain control 60 is connected to a line 274 which leads to the reverberation switches 62. When each switch 62 is actuated, the line 274 is connected to the corresponding reverberation bus 18 by way of a fixed contact 276, a movable contactor 278, a fixed contact 280, and a decoupling resistor 64, previously mentioned. When the reverberation switch 62 is not actuated, the fixed contact 280 is connected to the output common 218 by way of the movable contactor 278, a fixed contact 282, and a lead 284. The equalizer 46, previously mentioned, is illustrated in FIGS. 4 and 6. FIG. 4 constitutes a simplified schematic diagram of a portion of the equalizer, whereby selected high frequency and low frequency ranges may be boosted in amplitude. In this way, the frequency response of the input module may be varied over a wide range. The equalizer 46 also includes portions for cutting the high frequency and low frequency responses of the input module. Such portions will be described in connection with FIG. 6.

It will be seen that FIG. 4 shows the feedback send line 196 and the feedback receive line 198, which are also illustrated in FIG. 5, as already described. In FIG. 5, the equalizer 46 is shown simply as a block, but in FIG. 4 it is shown schematically, in a simplified form. It will be seen that the equalizer 46 comprises a low frequency boost network 290, and a high frequency boost network 292. Preferably, the networks 290 and 292 are connected in cascade between the feedback send line 196 and the feedback receive line 198. Thus, both networks 290 and 292 are in the feedback path.

The low frequency boost network 290 comprises first and second capacitors 294 and 296 which are connected in series between the feedback send line 196 and the intermediate line 298 which leads to the high frequency boost network 292. A first resistor 300 is connected between the amplifier common 160 and the junction 302 of the resistors 294 and 296. A second resistor 304 is connected in parallel with the series connected capacitors 294 and 296.

Preferably, the capacitors 294 and 296 are of variable value, so that the boost frequency range can be changed. The peak frequency, at which the maximum boost is produced, is lowered by increasing the values of the capacitors 294 and 296.

Preferably, the resistors 300 and 304 are arranged so that their values can be changed, so as to vary the extent of the boost. The resistors 300 and 304 are varied simultaneously, but inversely. Thus, the extent of the boost is increased by decreasing the value of the resistor 300, while simultaneously increasing the value of the resistor 304.

The high frequency boost network is arranged in a similar manner. Thus, the high frequency boost network 292 comprises a pair of capacitors 314 and 316, connected in series between the intermediate line 298 and the feedback receive line 198. A first resistor 320 is connected between the amplifier common 160 and the junction 322 between the capacitors 314 and 316. A second resistor 324 is connected in parallel with the series connected capacitors 314 and 316.

The capacitors 314 and 316 are preferably variable, or adjustable in value, for changing the peak frequency at which the maximum boost is produced. The resistors 320 and 324 are preferably variable or adjustable in value, to vary the extent of the boost. Preferably, the resistors 320 and 324 are varied simultaneously but inversely. Thus, the extent of the boost is increased by decreasing the value of the resistor 324.

The low and high frequency boost networks 290 and 292 are shown in greater detaail in FIG. 6. In this case, the values of the capacitors 294 and 296, 314 and 316 are changed by means of switches, preferably of the pushbutton type. Thus, the capacitor 294 is provided in the form of three separate capacitor components 294A, 294B, and 294C. Similarly, the capacitor 296 is provided in the form of three capacitor components 296A, 296B and 296C. In the high frequency boost network 292, the capacitor 314 is in the form of three capacitor components 314A, 314B and 314C, while the capacitor 316 comprises three capacitor components 316A, 316B and 316C.

It will be seen that the switching of the capacitor components 294A, 294B and 294C is controlled by two pushbutton switches 330 and 332. An off button 334 is also provided. Preferably, the switches 330 and 332 are mechanically interlocked, so that only one switch can be operated at one time. Conveniently, the operation of the switch 330 provides a low boost frequency of 1000 cycles. The operation of the switch 332 produces a low boost frequency of 100 cycles. The operation of the off button 334 produces a boost frequency of 50 cycles.

When the switch 330 is actuated, only the capacitor element 294A is utilized. The other capacitor components 294B and 294C are disconnected. The capacitor component 294A is connected directly between the feedback send line 196 and the junction 302.

Actuation of the switch 332 results in deactuation of the switch 330. The capacitor component 294B is connected in parallel with the component 294A by the components of the switch 330, comprising a fixed contact 336, a movable contactor 338, and a fixed contact 340. A high value resistor 342 is connected across the fixed contacts 336 and 340 to avoid switching transients. The operation of the switch 332 disconnects the capacitor component 294C.

Actuation of the off button 334 causes deactuation of both switches 330 and 332. The deactuation of the switch 332 connects the capacitor component 294C in parallel with the components 294A and 294B through components of the switch 332, including a fixed contact 344, a movable contactor 346, and a fixed contact 348. Here again, a transient suppressing resistor 350 is connected across the contacts 344 and 348.

The switching of the capacitor components 296A, 296B and 296C is brought about in a similar manner by means of pushbutton switches 360 and 362, which are ganged with the switches 330 and 332. Transient suppressing resistors 364 and 366 are provided, as before.

In the high frequency boost network 292, the switching of the capacitor components is accomplished in the same manner. Thus, interlocked pushbutton switches 370 and 372 are provided to switch the capacitor components 314A to 314C. These switches 370 and 372 are operated to provide high boost frequencies of 10,000 and 5,000 cycles. An off button 374 is also provided, which may be operated to provide a high boost frequency of 3,000 cycles. The capacitor components 316A to 316C are switched by pushbutton switches 380 and 382, ganged with the switches 370 and 372. Transient suppressing resistors 384, 385, 386 and 387 are provided, as before.

It will be seen that step switches are provided to vary the values of the resistors, 300, 304, 320, and 324. Thus, the resistor 300 is provided in the form of a series of resistor components 300A–300D, connected in series. A step switch 390 is provided to switch in the components 300A–300D successively.

Similarly, the resistor 304 is provided as a series of resistor components 304A–304D, connected in series. The resistor components 304A–304D are successively switched into and out of the circuit by a step switch 392, which is preferably ganged with the switch 390. The step switches 390 and 392 are arranged so that the resistance of the resistor 300 is decreased as the resistance of the resistor 304 is increased. As shown, the step switches 390 and 392 are in a neutral or zero boost position, in which the value of the resistor 304 is zero, while the value of the resistor 300 is infinite, inasmuch as the step switch 390 produces an open circuit.

A similar arrangement is employed in the high boost network 292. Thus, the resistor 320 is provided as a series of resistor components 320A–320D. A step switch 394 is provided to switch out the components 320A–320D successively. The resistor 324 is provided as a series of components 324A–324D. A step switch 396 is provided to switch in the components 324A–324D successively. The switches 394 and 396 are preferably ganged. As shown, the switches 394 and 396 are in a neutral or zero boost position, in which the value of the resistor 324 is zero, while the value of the resistor 320 is infinite, inasmuch as the step switch 394 produces an open circuit.

It has already been mentioned that the equalizer 46 is preferably provided with a low cut circuit 400 for cutting the low frequency response. The low cut circuit 400 is connected between the low cut line 222 and the output line 224 as previously mentioned. Thus, the low cut circuit 400 is in series with the program output.

The illustrated low cut circuit 400 comprises a step switch 402, whereby a plurality of different capacitors may be switched between the lines 222 and 224. Four such capacitors 404, 405, 406 and 407 are provided in the illustrated construction. The capacitors 404–407 are of progressively decreasing value. The switch 402 comprises a contactor 410 which is engageable with contact points 411–419. The contactor 410 is connected to the low cut line 222. The capacitors 404–407 are connected between the output line 224 and the successive contact points 412–415. The contact points 411 and 416–419 are connected directly to the output line 224. The switch 402 is shown in its zero cut position, in which the contactor 410 engages the contact point 411, so that the lines 222 and 224 are connected directly together. As the contactor 410 is moved along the contact points 412–415, the successively smaller capacitors 404–407 are switched into the circuit between the lines 222 and 224, so that the low frequencies response is cut. Preferably, the low cut switch 402 is ganged with the low boost switches 390 and 392. The low cut positions are to the left of the neutral position, while the low boost positions are to the right thereof.

It is preferred to provide a plurality of high value resistors 422 to suppress switching transients. Each resistor 422 is connected between the line 222 and one of the contact points 412–415.

A high cut circuit 424 is preferably provided for selectively cutting the high frequency response of the input module. As shown, the high cut circuit 424 comprises a capacitor 426, a step switch 428, and a series of resistors 431–433, adapted to be connected in a series circuit between the feedback receive line 198 and the feedback send line 196. It will be seen that the switch 428 comprises a movable contactor 438 and a series of contact points 440–444. The capactitor 426 is connected between the feedback receive line 198 and the contactor 438. It will be seen that the resistors 431–433 are connected between the successive contact points 441–444. The contact point 444 is connected to the feedback send line 196. A resistor 446 is connected between the contact point 441 and the common lead 160. A transient suppressing resistor 448 of high value is connected between the contact point 441 and the contactor 438.

Preferably, the high cut step switch 428 is ganged with the high boost switches 394 and 396. The switches are shown in their neutral positions. Movement of the switches to the left cuts the high frequency response, while movement to the right boosts the high frequency response. In the neutral position, the high cut circuit is inactive, because the contactor 438 engages the contact point 440, which has no connection. The low boost network 290 and the high boost network 292 are also inactive when the switches 390, 392, 394 and 396 are in their neutral positions. The feedback send line 196 is connected directly to the intermediate line 298 by the switch 392, while the intermediate line 298 is connected directly to a line 450 by the switch 396. A resistor 452 is connected between the line 450 and the feedback reecives line 198. Thus, the feedback path effectively includes only the resistors 452.

When the high cut switch 428 is moved to the left, additional negative feedback at high frequencies is introduced through the capacitor 426 and the series connected resistors 432–433. The resistors 431–433 are successively switched out of the circuit as the contactor 438 is moved along the contact points 441–444.

When the high boost switches 394 and 396 are moved to the right from their neutral positions, the negative feedback is diminished in the selected high frequency range, with the result that the frequency response of the amplifier is boosted. The boost frequency may be changed by operating the switches 370 and 372, and the ganged switches 380 and 382.

When the low boost switches 390 and 392 are moved to the right from their neutral positions, the negative feed-back is diminished in the selected low frequency range, with the result that the response of the amplifier is boosted. The boost frequency may be changed by operating the switches 330, 332, 360 and 362.

When the low cut switch 402 is moved to the left from its neutral position, the response of the amplifier at low frequencies is reduced by switching successively smaller capacitors in series with the output line 224.

It will be recognized that the equalizer 46 has many advantages. The low boost frequencies and the high boost frequencies are selectable, so that the equalizer affords a high degree of flexibility. It has been found that the boost curves are desirable in form, with definite peaks. The extent of the low frequency boost and the high frequency boost can also be varied.

The equalizer does not utilize any inductors or "twin-T" filters. Accordingly, the equalizer may be produced at extremely low cost. Moreover, it has been found that the transient response of the equalizer is superior. The values of the resistors and capacitors are not critical, so that no precision components are required.

The input impedance of the equalizer boost networks remains high at all settings of the controls, so that the output of the amplifier is not unduly loaded. The high boost network presents a high impedance to the output of the low boost network at all positions of the controls.

Figure 7:
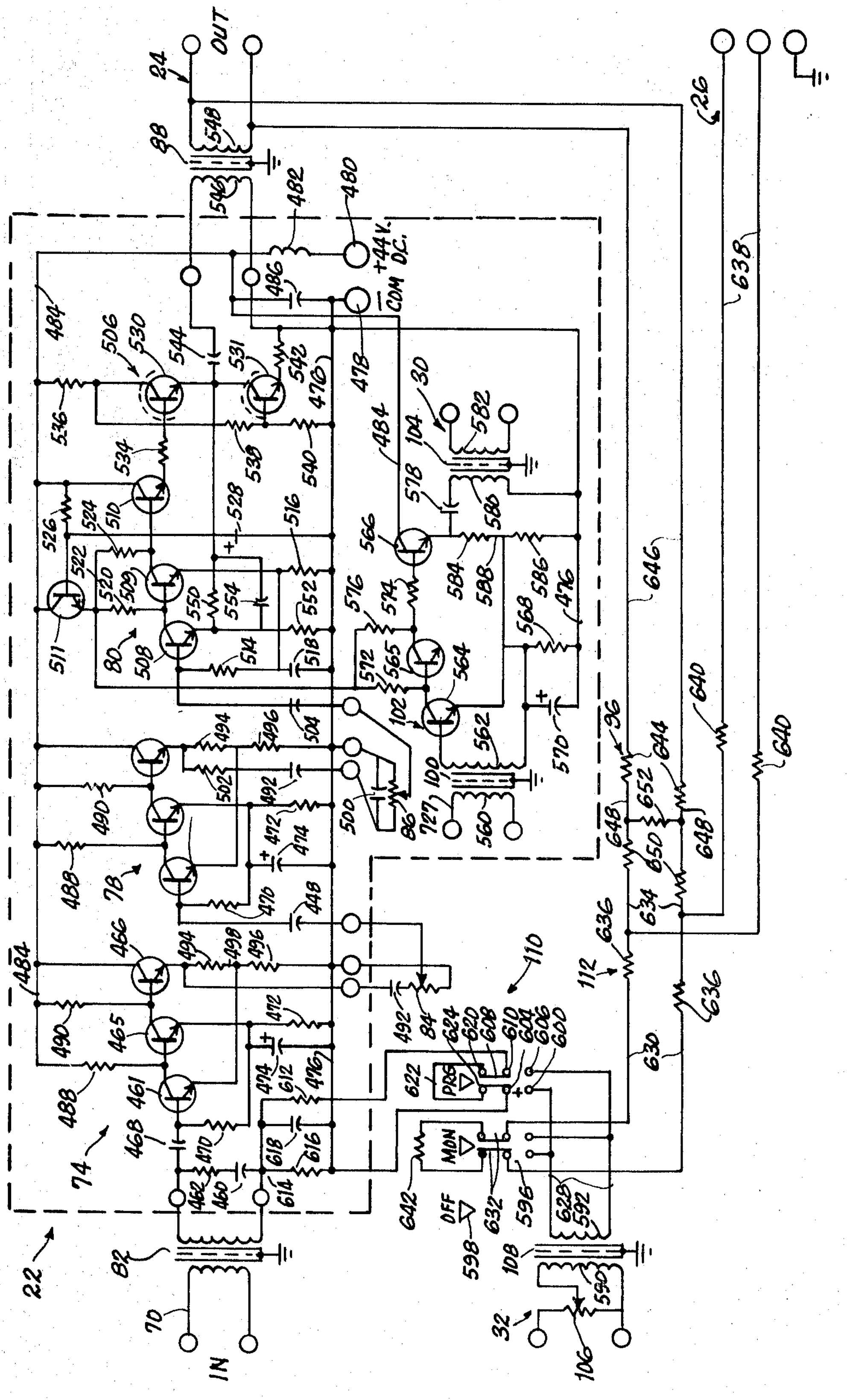
FIG. 7 is a schematic wiring diagram of one of the output modules.

The details of one of the output modules 22 are shown in FIG. 7. As previously indicated, the input line 70 to the module 22 is connected to the primary of the input transformer 82. The secondary of the transformer 82 is connected to the input of the program amplifier 74. A capacitor 460 and a resistor 462 are connected in series across the secondary of the transformer 82.

In the illustrated amplifier 74, the first two amplifier stages 76 and 78 are substantially the same in construction. Consequently, only the first stage 76 need be described in detail. The same description may be applied to the second stage 78.

It will be seen that the amplifier stage 76 comprises three direct coupled transistors 464, 465 and 466. The base of the first transistor 464 is coupled through a capacitor 468 to one side of the secondary of the transformer 82. To provide biasing for the base, a resistor 470 is connected between the base and the emitter of the second transistor 465. A biasing resistor 472, shunted by a by-pass capacitor 474, is connected between the emitter and the amplifier common or ground lead 476, to which the negative power supply terminal 478 is connected. The positive power supply terminal 480 is connected through a small value filtering inductor 482 to a supply lead 484. A by-pass capacitor 486 is connected between the supply lead 484 and the common lead 476.

It will be seen that the collector of the first transistor 464 is connected directly to the base of the second transistor 465. A high value load resistor 488 is connected between the collector and the positive supply lead 484.

The collector of the second transistor 465 is connected directly to the base of the third transistor 466. A load resistor 490 is connected between the collector and the positive supply lead 484. The collector of the third transistor 466 is connected directly to the positive supply lead 484.

The output of the first stage 76 is taken from the emitter of the third transistor 466, through a coupling capacitor 492, connected to one side of the gain control 84, previously mentioned, which is preferably in the form of a continuously variable potentiometer. The other side of the gain control 84 is connected to the common lead 476. The slider of the gain control 84 is connected to the input of the second stage 78, through the input coupling capacitor 448 thereof.

To develop the output voltage of the first amplifier stage 76, resistors 494 and 496 are connected in series between the emitter of the third transistor 466 and the common lead 476. The two resistors 494 and 496 provide the load resistance for the third transistor 466. Negative feedback is provided by connecting the emitter of the first transistor 464 to the junction 498 between the two resistors 494 and 496. The portion of the output voltage across the resistor 496 provides the negative feedback. The feedback connection also provides a biasing voltage for the emitter of the first transistor 464.

It has already been indicated that the second stage 78 is the same as the first stage 76. The same reference characters have been applied to the individual components of the second stage. The output coupling transistor 492 of the second stage 78 is connected to one side of the gain control 86, which is a component of the master gain control module 34, as previously mentioned. The other side of the gain control 86 is connected to the common lead 476. A small filtering capacitor 500 is connected across the gain control 86. In the second stage 78, a small filtering resistor 502 is connected in series with the output coupling resistor 492.

It will be understood that the master gain control module 34 comprises a plurality of the gain controls 86, so that one such gain control is provided for each output module 22. All of the gain controls 86 are ganged for simultaneous operation.

The slider of the gain control 86 is coupled to the input of the third amplifier stage 80 through a coupling capacitor 504. The output of the third stage 80 feeds into a power output stage 506.

The third amplifier stage 80 comprises three amplifying transistors 508, 509 and 510, together with a switching transistor 511. The base of the first transistor 508 is connected to the input coupling capacitor 504. As before, a biasing voltage is provided by connecting a return resistor 514 between the base of the first transistor 508 and the emitter of the second transistor 509. A biasing resistor 516, in parallel with a by-pass capacitor 518, is connected between the emitter and the common lead 476.

The collector of the first transistor 508 is connected directly to the base of the second transistor 509. A high value load resistor 520 is connected between the collector and a positive supply lead 522, which is subject to the switching action of the transistor 511, as will be described in detail presently.

The collector of the second transistor 509 is connected directly to the base of the third transistor 510. A load resistor 524 is connected between the collector and the positive supply lead 522. The collector of the third transistor 510 is connected directly to the positive supply lead 484.

The purpose of the switching transistor 511 is to provide a slight delay in application of the positive power supply voltage to the transistors 508 and 509, so as to avoid noises in the program output when the power supply is energized. The collector of the transistor 511 is connected to the positive supply lead 484, while the emitter is connected to the supply lead 522. The base is connected to the supply lead 484 through a resistor 526. A capacitor 528 is connected between the base and the common lead 476.

Under normal operating conditions, the base of the transistor 511 is at the full positive voltage which is applied to the collector, so that the transistor 511 is conductive. Thus, substantially the full positive voltage is applied to the lead 522.

However, when the positive voltage is first applied to the lead 484, the charging of the capacitor 528 through the resistor 526 provides a slight delay, before the transistor 511 becomes conductive.

The illustrated output stage 506 comprises two directly coupled output transistors 530 and 531. The base of the first transistor 530 is connected to the emitter of the transistor 510 through a resistor 534. A load resistor 536 of small value is connected between the collector of the transistor 530 and the positive supply lead 484. The phase inverted voltage developed by the resistor 536 is applied to the second transistor 531, through a resistor 538, connected between the collector of the first transistor 530 and the base of the second transistor 531. A return resistor 540 is connected between the base and the common lead 476. The two resistors 538 and 540 reduce the level of the phase inverted signal applied to the base, while also providing a low biasing voltage on the base.

The emitter of the first transistor 530 is connected to the collector of the second transistor 531. The emitter of the second transistor 531 is connected to the common lead 476 through a low value resistor 542, which provides negative feedback and a small biasing voltage.

The output from the power amplifier stage 506 is taken from the emitter of the first transistor 530, through a coupling capacitor 544, connected to one side of the primary winding 546 of the output transformer 88, previously mentioned. The other side of the primary 546 is connected to the common lead 476. The secondary 548 of the transformer 88 is connected to the output line 24, previously mentioned.

Negative feedback is provided in the amplifier stages 80 and 506 by connecting a resistor 550 between the emitter of the output transistor 530 and the emitter of the input transistor 508. A resistor 552 of small value is connected between the emitter of the input transistor 508 and the common lead 476. Additional negative feedback at very high frequencies is provided by connecting a small capacitor 554 in parallel with the resistor 550. The resistors 550 and 552 provide a small amount of negative feedback, while also providing a small biasing voltage on the emitter of the transistor 508.

As previously mentioned, the reverberation input line 72 of the output module 22 is connected to one of the reverberation buses 18. The line 72 is connected to the primary winding 560 of the transformer 100, previously mentioned. The secondary winding 562 is connected to the input of the reverberation amplifier 102. As shown, the amplifier 102 comprises three transistors 564, 565, and 566. The base of the first transistor 564 is connected to one side of the secondary 562. The other side of the secondary is connected to the emitter of the second transistor 565, to drive a biasing voltage, which is produced across a resistor 568, connected between the emitter and the common lead 476, previously mentioned. A by-pass capacitor 570 is connected across the resistor 568.

The collector of the first transistor 564 is connected directly to the base of the second transistor 565. A load resistor 572 is connected between the collector and the positive supply lead 522, which is subject to the switching action of the transistor 511, as previously described.

The collector of the second transistor 565 is connected to the base of the third transistor 566 through a resistor 574. A load resistor 576 is connected between the collector and the positive lead 522. The collector of the third transistor 566 is connected directly to the positive lead 484.

The output of the reverberation amplifier 102 is derived from the emitter of the third transistor 566, through a coupling capacitor 578, connected to one side of the primary winding 580 of the output transformer 104. The other side of the primary 580 is connected to the common lead 476. The transformer 104 has a secondary winding 582 which is connected to the reverberation send line 30, previously mentioned. Load resistors 584 and 586 are connected in series between the emitter of the third transistor 566 and the common lead 476. To provide negative feedback, the emitter of the first transistor 564 is connected to the junction 588 between the resistors 584 and 586. This connection also provides a small biasing voltage on the emitter.

It will be recalled that the reverberation send line extends to the input of one of the reverberation generators 28. The output of the reverberation generator is received by the output module over the reverberation receive line 32. The reverberation receive gain control 106 is preferably in the form of a continuously variable potentiometer connected to the line 32. The input transformer 108 has a primary winding 590 connected to the variable output of the gain control 106. The transformer 108 has a secondary winding 592 adapted to be switched between the input of the program amplifier 74 and the monitor output line 26, by means of the selector switch 110.

As illustrated, the selector switch 110 comprises 2-position pushbutton switches 594 and 596, designated program and monitor. The switches 594 and 596 are mechanically interlocked so that only one switch can be operated at one time. An off button 598 is also preferably provided.

When both switches 594 and 596 are off, the secondary winding 592 is left unconnected. When the program switch 594 is actuated, one side of the secondary 592 is connected to the amplifier common 476 by a stationary contact 600, a contactor 602, and a contact 604. The other side of the secondary 592 is connected through a contact 606, a contactor 608, a contact 610, and a resistor 612 to a reverberation input terminal 614 in the program amplifier 74. The terminal 614 is connected to the return side of the secondary winding of the program input transformer 82. Through the secondary winding and the coupling capacitor 468, the reverberation signals are applied to the base of the first transistor 464. A resistor 616 is connected between the input terminal 614 and the common lead 476. It will be seen that a small value capacitor 618 is connected across the resistor 616, to cut the very high frequencies in the reverberation signal.

When the program switch 594 is in its off position, the contact 610 is connected through the contactor 608, a contact 620, a lead 622, a contact 624, the contactor 602, and a contact 604 to the common lead 476, so that the resistor 612 is effectively connected in parallel with the resistor 616.

When the monitor switch 596 is actuated, the secondary leads 628 from the transformer 108 are connected to a pair of lines 630 by means of contactors 632. The attenuating means 112, previously mentioned, are preferably connected from the lines 630 to lines 634. As shown, the attenuating means 112 take the form of a pair of resistors 636. The monitor output line 26 comprises leads 638 which are connected through resistors 640 to the lines 634. Thus, the reverberation signal is supplied to the monitor output line 26 through the voltage 596 and the resistors 636 and 640.

When the monitor switch 596 is in its off position, a resistor 642 is connected across the lines 630, as a substitute for the transformer secondary 592.

As previously indicated, a portion of the program output signal is supplied to the monitor output 26 through the decoupling means 96. As shown, the decoupling means 96 comprise a pair of resistors 644, connected from lines 646 to lines 648. The lines 646 extend to the secondary 548 of the program output transformer 88. The lines 648 are connected to the lines 634 by a pair of resistors 650. It will be seen that a resistor 652 is connected between the lines 648. It will be understood that the resistors 644 and 652 attenuate the signals derived from the program output line 24, before such signals are supplied to the monitor output line 26, Some further attenuation is provided by the resistors 650 and 640.

When the monitor switch 596 is actuated, the signals from the reverberation generator 28 are supplied to the monitor output line 26 so that such signals can be heard on the monitoring equipment, before they are introduced introduced into the program channel. The program output signals are also supplied to the monitor output line 26, so that the combined effect of the program signals and the reverberation signals can be heard.

When the program switch 594 is operated, the reverberation signals are supplied to the input of the program amplifier 74. In this way, the reverberation signals are mixed with the program signals. A gain control 106 may be employed to adjust the level of the reverberation signals.

When the off button 598 is operated, the reverberation signals are not supplied to either the monitor output line 26 or the input to the program amplifier 74. Thus, the programs signals are heard on the monitor without reverberation.

It may be helpful to summarize the operation of the mixing system, although the operation has already been fully described. The system is adapted to receive and mix a plurality of input signals, from a plurality of different microphones or the like. Each input signal is amplified by one of the input modules 12. The input attenuator 40 makes it possible to handle input signals at widely varying levels.

The frequency response of the input module can be changed over a wide range by varying the controls of the equalizer 46. A selected low frequency range can be boosted. Both the boost frequency and the extent of the boost can be varied. The low frequency response can also be cut. Similarly, a selected high frequency range can be boosted. Both the boost frequency and the extent of the boost can be varied. The high frequency response can also be cut.

By operating the mixer gain control 52, the level of the program output from the input module 12 can be varied. The reverberation output can be varied by operating the reverberation gain control 60. The switch 58 makes it possible to derive the reverberation output either before or after the mixer gain control 52.

The program output can be assigned to any or all of the program buses 16 by operating the program switches 54. At the same time, the corresponding reverberation switches 62 are operated to assign the reverberation output signal to the corresponding reverberation buses 18.

Each of the output modules 22 is connected to one of the program buses 16 and also to the corresponding reverberation bus 18. The signals from the program bus are amplified by the program amplifier 74. The channel gain control 84 can be operated to vary the gain of the amplifier 74. The gain of all of the program amplifiers in the output modules 22 can be varied by operating the master gain controls 86, which are incorporated into the master gain control module 34.

The program output line 24 of each output module 22 may be connected to any desired utilization equipment, such as tape recorders, power amplifiers or the like. A portion of the program output signal is also supplied to the monitor output line 26, to which any desired monitoring equipment may be connected.

The signals from the reverberation bus 18 are amplified by the reverberation amplifier 102, the output from which is supplied to the reverberation generator by way of the reverberation send line 30. The output of the reverberation generator 28 comes back to the output module 22 by way of the reverberation receive line 32. By operating the gain control 106, the level of the reverberation signal can be varied. The switching device 110 makes it possible to switch the reverberation signal to either the monitor output line 26 or the input to the program amplifier 74. In this way, the reverberation signals can be heard on the monitoring equipment before they are switched into the program channel.

It will be apparent that the mixing system provides a high degree of flexibility so that the needs of most recording studios and sound reinforcing systems can readily be met. At the same time, the mixing system is compact and economical, because of the incorporation of most of the components into the input modules 12, the output modules 22, and the master gain control module 34.

It will be understood by those skilled in the art that the values of the various illustrated components may be varied widely, to suit varying needs. However, it may be helpful to offer the following table giving one possible set of values for the various components:

RESISTORS

| | Values (ohms) | | Values (ohms) |
|---|---|---|---|
| **52** | 10K. | **320A** | 2.7K. |
| **56** | 47K. | **320B** | 1K. |
| **60** | 100K. | **320C** | 750 |
| **64** | 100K. | **320D** | 2.4K. |
| **66** | 220K. | **324A** | 3.6K. |
| **84** | 10K. | **324B** | 2K. |
| **86** | 10K. | **324C** | 2K. |
| **106** | 10K. | **324D** | 2.7K. |
| **126** | 1.1K. | **342** | 4.7M. |
| **128** | 1.1K. | **350** | 4.7M. |
| **130** | 270 | **364** | 4.7M. |
| **132** | 1.1K. | **366** | 4.7M. |
| **134** | 1.1K. | **384** | 4.7M. |
| **136** | 270 | **385** | 4.7M. |
| **138** | 1.1K. | **386** | 4.7M. |
| **140** | 1.1K. | **387** | 4.7M. |
| **142** | 240 | **422** | 4.7M. |
| **156** | 1M. | **431** | 2.7K. |
| **158** | 2.2M. | **432** | 3.3K. |
| **164** | 1M. | **433** | 4.3K. |
| **170** | 5.6K. | **446** | 4.3K. |
| **174** | 39K. | **448** | 4.7M. |
| **176** | 68K. | **452** | 200K. |
| **204** | 10K. | **462** | 330K. |
| **206** | 100K. | **470** | 220K. |
| **208** | 220K. | **472** | 18K. |
| **268** | 100K. | **488** | 1M. |
| **272** | 100K. | **490** | 100K. |
| **300A** | 4.7K. | **494** | 4.7K. |
| **300B** | 1.5K. | **496** | 1K. |
| **300C** | 2K. | **502** | 470 |
| **300D** | 5.6K. | **514** | 220K. |
| **304A** | 7.5K. | **516** | 5.6K. |
| **304B** | 3.9K. | **520** | 1M. |
| **304C** | 3.9K. | **524** | 100K. |
| **304D** | 4.7K. | **526** | 220K. |

| | Values (ohms) | | Values (ohms) |
|---|---|---|---|
| **534** | 10K. | **584** | 2.2K. |
| **536** | 75 | **586** | 300 |
| **538** | 20K. | **612** | 33K. |
| **540** | 1K. | **616** | 10K. |
| **542** | 39 | **636** | 200 |
| **550** | 15K. | **640** | 200 |
| **552** | 470 | **642** | 620 |
| **568** | 16K. | **644** | 2.4K. |
| **572** | 1M. | **650** | 200 |
| **574** | 10K. | **652** | 620 |
| **576** | 100K. | | |

CAPACITORS

| | Values (microfarads, unless otherwise indicated) | | Values (microfarads, unless otherwise indicated) |
|---|---|---|---|
| **154** | .047 | **404** | .33 |
| **172** | 25 | **405** | .22 |
| **186** | .1 | **406** | .12 |
| **194** | 50 | **407** | .082 |
| **200** | 2.2 | **426** pfd | 360 |
| **202** | .47 | **460** | .01 |
| **210** | 5 | **468** | .47 |
| **294A** | .01 | **474** | 5 |
| **294B** | .082 | **486** | .1 |
| **294C** | .1 | **492** | 2.2 |
| **296A** | .027 | **500** | .015 |
| **296B** | .22 | **504** | .47 |
| **296C** | .27 | **518** | 5 |
| **314A** | .001 | **528** | 5 |
| **314B** | .0015 | **544** | 50 |
| **314C** | .0022 | **554** pfd | 33 |
| **316A** | .01 | **570** | 5 |
| **316B** | .0056 | **578** | 5 |
| **316C** | .0082 | **618** pfd | 3900 |

INDUCTORS

| | Values (microhenries) |
|---|---|
| **182** | 10 |
| **482** | 10 |

Various other modifications, alternative constructions and equivalents may be employed without departing from the true spirit and scope of the invention, as exemplified in the foregoing description and defined in the following claims.

I claim:

1. An audio mixing system, comprising the combination of
- a plurality of input modules,
- a plurality of program buses connected to said input modules,
- a plurality of reverberation buses connected to said input modules,
- a plurality of output modules,
- means connecting each output module to one of said program buses,
- means connecting each output module to one of said reverberation buses,
- a plurality of reverberation generators,
- and means connecting said reverberation generators to said output modules,
- each output module comprising a program amplifier and control means for selectively connecting the corresponding reverberation generator between the corresponding reverberation bus and the input of the program amplifier.

2. A system according to claim 1,
- in which each input module comprises means for directing the output thereof to any of said program buses,
- and means for directing the output thereof to the corresponding reverberation buses.

3. A system according to claim 1, in which each input module comprises a program level control for regulating the level of the signals supplied to said program buses, and a reverberation level control for regulating the level of the signals supplied to said reverberation buses.

4. A system according to claim 1, in which each output module comprises a reverberation amplifier connected between the corresponding reverberation bus and the input of the corresponding reverberation generator, said control means comprising switching means connected between the output of such reverberation generator and the input of the corresponding program amplifier.

5. A system according to claim 1, in which each output module comprises a monitor output, said control means comprising switching means for switching the output of the corresponding reverberation generator between said monitor output and the input of the corresponding program amplifier.

6. A system according to claim 1, in which each output module comprises a reverberation amplifier connected between the corresponding reverberation bus and the corresponding reverberation generator, each output module comprising a monitor output, and means for connecting said monitor output to the output of said program amplifier, said control means comprising switching means for switching the output of such reverberation generator between said monitor output and the input of said program amplifier.

References Cited

UNITED STATES PATENTS

| | | |
|---|---|---|
| 2,931,862 | 4/1960 | Vermeulen et al. |
| 3,024,309 | 3/1962 | Kleis. |

KATHLEEN H. CLAFFY, Primary Examiner

C. W. JIRAUCH, Assistant Examiner

PO-1050
(5/69)

UNITED STATES PATENT OFFICE
CERTIFICATE OF CORRECTION

Patent No. 3,541,260 Dated November 17, 1970

Inventor(s) John P. Jarvis

It is certified that error appears in the above-identified patent and that said Letters Patent are hereby corrected as shown below:

Column 5, line 19, change "well" to --will--;

Column 5, line.23, Change "and" to --is--;

Column 7, line 7, Change "216" to --60--;

Column 10, line 17, Change "receives" to --receive--.

SIGNED AND SEALED MAR 9 1971

Mar. 9, 1971

(SEAL)
Attest:

Edward M. Fletcher, Jr.
Attesting Officer

WILLIAM E. SCHUYLER, JR.
Commissioner of Patents